United States Patent [19]
Shuster et al.

[11] Patent Number: 4,859,265
[45] Date of Patent: Aug. 22, 1989

[54] PROCESS FOR MANUFACTURING OF HEAT EXCHANGERS FROM POLYMERS

[75] Inventors: Jerry P. Shuster, Oakville; Anthony Cesaroni, Agincourt, both of Canada

[73] Assignee: Du Pont Canada Inc., Mississauga, Canada

[21] Appl. No.: 178,386

[22] Filed: Apr. 6, 1988

[30] Foreign Application Priority Data

Apr. 8, 1987 [GB] United Kingdom ............... 8708387
Apr. 8, 1987 [GB] United Kingdom ............... 8708388

[51] Int. Cl.$^4$ ............................................. B32B 31/12
[52] U.S. Cl. ................................... 156/292; 126/445; 156/289; 165/170; 165/905
[58] Field of Search ............... 126/444, 445; 156/145, 156/289, 291, 292; 165/170, 905

[56] References Cited

U.S. PATENT DOCUMENTS

| | | | |
|---|---|---|---|
| 3,066,389 | 12/1962 | Jaeger | 29/157.3 |
| 3,334,398 | 8/1967 | Middleton | 29/157.3 |
| 4,146,012 | 3/1979 | Elkins et al. | 126/444 |
| 4,524,757 | 6/1985 | Buckley | 126/426 |
| 4,651,811 | 3/1987 | Frauenfeld | 165/10 |

FOREIGN PATENT DOCUMENTS

1952785 4/1971 Fed. Rep. of Germany .
465564 2/1977 United Kingdom .

OTHER PUBLICATIONS

U.S. patent application Ser. No. 07/178,385 (filed Apr. 6, 1988).

Primary Examiner—Robert A. Dawson

[57] ABSTRACT

A process for the manufacture of a heat exchanger from a thermoplastic polymer especially a polyamide, is disclosed. The heat exchanger comprises two generally planar panels formed from a composition of the polymer, bonded together to form a labryinth of fluid passages between the panels that extend between inlet and outlet means. The labyrinth occupies a substantial proportion of the area of the panels. The process comprises coating a first panel with a first coating in a pattern corresponding to the fluid passages of the labyrinth, and coating the second panel with a second coating composition in at least those areas where a bond is to be formed with the first panel. The coating compositions are selected so that under the influence of heat, the second coating composition will bond to the polymer composition but not to the first coating; thus the first coating acts as a resist coating. The coated panels are brought into contact and heated so as to effect bonding, and then the passages are expanded e.g. by applying a pressure of a gas to the fluid passages between the panels. The expanded fluid passages should be heat set so as to reduce distortion during use of the resultant heat exchanger. Depending on the polyamide selected for fabrication of the heat exchanger, the heat exchangers may be used in a variety of end uses, including in automobiles.

4 Claims, 1 Drawing Sheet

PROCESS FOR MANUFACTURING OF HEAT EXCHANGERS FROM POLYMERS

The present invention relates to a process for the manufacture of heat exchangers from thermoplastic polymers, especially polyamides, and especially to the manufacture of heat exchangers of the so-called plate or panel type from such polymers.

Heat exchangers fabricated from conductive materials e.g. metals, are well known and are used in a wide variety of end uses. Such end uses include as heat exchangers in automotive and similar vehicles to transfer surplus heat from power train coolants and lubricants to the atmosphere and for controlling the temperature of passenger compartments i.e. as comfort heat exchangers. Traditionally such heat exchangers have tended to be of a core type in which liquid medium is passed through multiple liquid passages in an open structure core, with air being passed in a direction perpendicular to the core. Plate or panel heat exchangers are, however, also known and are characterized by passage of air over the relatively planar surface of that type of heat exchanger.

It has been traditional to fabricate heat exchangers, including plate heat exchangers, from a heat conductive metal, especially aluminum. The use of aluminum has the advantage that heat is rapidly conducted through the metal and that the structure has good strength characteristics suitable for many end uses. However, it is difficult to form metals, including aluminum, in an economical manner into thin, light weight, structures having adequate strength.

Thermoplastic polymers are frequently relatively easy to form into thin structures, especially into film or sheet, but the heat transmission characteristics of thermoplastic polymers tends to be poor, especially in comparison to metals. A tube-type heat exchanger has, however, been developed using a thermoplastic polymer viz. polytetrafluoroethylene, and such heat exchangers have found use in corrosive environments.

A method has now been found to fabricate panel heat exchangers from thermoplastic polymers, especially polyamides.

Accordingly, the present invention provides a process for the manufacture of a heat exchanger from a thermoplastic polymer, said heat exchanger comprising a first panel and a second panel, each of said panels being generally planar and formed from said polymer, said panels being bonded together to define a labyrinth of fluid-flow passages extending between inlet and outlet header means, said labyrinth occupying a substantial proportion of the area of the panels, said process comprising the steps of:

(a) coating the first panel with a first coating composition in a pattern corresponding to the fluid passages of the labyrinth;

(b) coating the second panel with a second coating composition in at least those areas corresponding to the areas of the first and second panel that will be bonded together; and (c) contacting said first and second panels and applying heat and pressure thereto to effect bonding between said panels;

(d) said second coating composition being such that the composition adheres to the polymer of the first panel but not to the first coating composition under the influence of the heat and pressure applied in step (c).

The present invention also provides a process for the manufacture of a heat exchanger from a heat-sealable thermoplastic polymer, especially an amorphous polyamide, said heat exchanger comprising a first panel and a second panel, each of said panels being generally planar and formed from said polymer, said panels being bonded together to define a labyrinth of fluid passages extending between inlet and outlet header means, said labyrinth occupying a substantial proportion of the area of the panels, said process comprising the steps of:

(a) coating the first panel with a first coating composition in a pattern corresponding to the fluid passages of the labyrinth; and (b) contacting said first and second panels and applying heat thereto to effect bonding between said panels;

(c) said first coating composition being such that the composition does not adhere to the polymer of the first panel under the influence of the heat applied in step (b), said first coating being comprised of polyvinyl alcohol.

In preferred embodiments of the process of the present invention, the thermoplastic polymer is a polyamide.

In other embodiments, the first coating composition comprises polyvinyl alcohol.

In further embodiments, the fluid flow passages are subsequently expanded to facilitate flow of fluid.

The present invention will be described with particular reference to the drawings in which.

Figure 1:
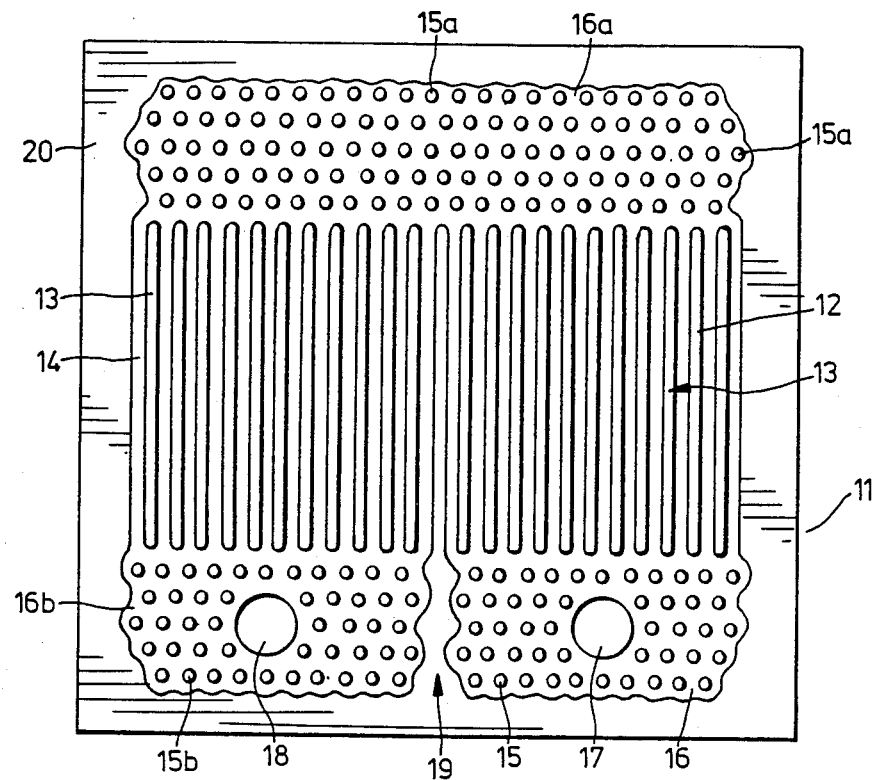
FIG. 1 is a plan view of a panel heat exchanger of the present invention.

FIG. 1 shows a panel, generally indicated by 11, of a heat exchanger having a pattern 12 of a labyrinth printed thereon. The pattern shown comprises a series of elongated, substantially parallel, strips 13 separated by a corresponding series of channels 14. The strips and channels are centrally located in the panel and cover a major portion of the area of the panel, extending essentially over the full width of the panel and over the mid portion of the length of the panel. The pattern also has a series of circular islands, 15, 15A and 15B, located at each end of the panel and in spaced apart relationship. Channels 14 and the spaces between the islands form fluid flow passages of the panel heat exchanger and are designated as areas 16, 16A and 16B.

At one end of the panel, there are two orifices, 17 and 18, which form part of the inlet and outlet header means of the heat exchanger, as discussed below with reference to FIG. 3. Each of orifices 17 and 18 is surrounded by circular islands 15 but orifices 17 and 18 are separated from direct fluid flow communication by barrier 19.

The pattern on the panel 11 also has an edge 20 extending completely around panel 11, which forms the edge seal of the heat exchanger.

The pattern on panel 11 is such that a labyrinth of fluid passages of the heat exchanger is defined, from inlet orifice 17 through space 16 surrounding circular islands 15, through channels 14 to the opposing end of the heat exchanger panel, through further space 16A surrounding spots 15A and back through the remainder of channels 14, through space 16B and to outlet orifice 18.

In FIG. 1, the header areas 20 are shown having bonded zones 32 in the form of circular islands. However, the islands may be of any convenient shape, including hexagonal, diamond-shaped or the like. Header areas 20 have fluid-flow passages 34 around the islands. The header areas are interspersed with fluid-flow passages through channels 10. All of the fluid-flow passages 34 of the heat exchanger in combination form a labyrinth of fluid-flow passages in the panel heat exchanger.

FIG. 1 shows a labyrinth of fluid-flow passages formed by circular islands and channels. It is to be understood that the proportion of the panel heat exchanger having islands and having channels may be varied, including an embodiment of a panel heat exchanger having only islands. In addition, indentations or projections, or the like, not shown, may be placed in the spaces between the islands to cause turbulence in the flow of fluid through the fluid-flow passages of the heat exchanger, which tends to improve heat transfer characteristics of the panel heat exchanger.

The invention has been particularly described with reference to the drawings. It is to be understood, however, that the panel heat exchanger may be of the shape shown in the figures or be linear or any other convenient shape for the intended end-use.

Figure 3:
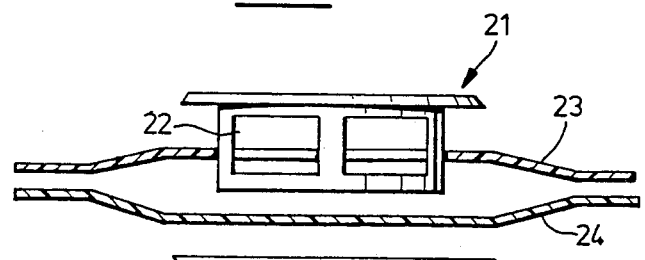
FIG. 3 illustrates how a fluid connection may be made in the heat exchanger.

An example of an inlet, or outlet, is shown in FIG. 3. A collar 21 with apertures 22 is shown as inserted into aperture 17 in panel 23. In the embodiment shown panel 24 has a corresponding aperture and a flange 25 is welded to the bottom of collar 21 in order to clamp collar 21 in place and obtain a fluid-tight seal of collar 21 in the heat exchanger.

In the process of the present invention, one panel is coated with a coating composition in the pattern shown in FIG. 1. The nature of that coating composition, which is a resist coating, is described below. The resist coating is applied in the areas where fluid flow will be required through the labyrinth of fluid-flow passages i.e. at areas 16, 16A and 16B and at channels 14.

A second panel, that will form the complementary side of the heat exchanger, is coated with a second coating composition and such coating may be applied in a number of ways. For instance, the second panel may be coated in a manner complementary to the coating applied to the first panel i.e. so that when the two panels are brought into face-to-face contact during the manufacture of the panel heat exchangers, the resist coating and coating on the second panel do not come into face-to-face contact. Alternatively, the second panel may be completely coated with the second coating composition. In another embodiment, the second panel is coated to an extent more than the complementary image of the coating applied to the first panel but less than a full coating. It will normally be most convenient to fully coat the second panel, for ease of operation of the process of coating the second panel and to ensure that all areas of the complementary image of the coating on the first panel are coated on the second panel. The nature of the coating on the second panel is also discussed below.

In the fabrication of the heat exchanger, the first panel and the second panel are brought into contact in a face-to-face manner. The panels may then be heated, especially under pressure, so as to effect bonding between the two panels.

Figure 2:
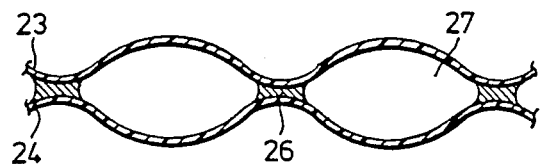
FIG. 2 is a fragmentary view in cross-section of the heat exchanger.

The coatings applied to the panels are such that where the resist coating is present on the first panel, bonding of the first panel to the second panel does not occur, but where the resist coating is absent bonding does occur. In order to form the actual fluid passages from the resultant bonded panels, the bonded panels may be inserted between two sections of a mould in a press; such moulds may have grooves or recesses corresponding to the labyrinth of passages to be formed in the panels. The mould is heated to a temperature above the softening point of the polymer and then the sections of the mould are slowly moved apart. As the sections of the mould are moved apart, a gas, usually air, is forced between the first panel and second panel, by means not shown, to provide a pressure of gas in the fluid passages of the labyrinth and thereby cause the passages to form, especially by expansion of the polymer into any grooves or recesses of the mould. This may be accomplished without disrupting bonds between the two panels. Subsequently, prior to removal of the panel thus formed from the mould, the temperature of the panels should be increased to above the expected operating temperature of the resultant heat exchanger, in order to reduce distortion of the fluid flow passages during use of the heat exchanger. The fragmentary section shown in FIG. 2 illustrates the resultant structure. The two panels, represented by 23 and 24, are bonded together at bond 26 but spaced apart at passage 27, passage 27 being part of the labyrinth of fluid-flow passages.

The coating applied to the second panel is a coating that promotes bonding between the polymer of the first and second polymer, which will normally be the same polymer. Such coatings are known and include a wide variety of adhesives. The nature of the coating applied to the second panel will depend on a number of factors other than the particular polymer from which the panels are fabricated. For instance, the coating must be such that it will not adhere significantly to the resist coating that is applied to the first panel. Moreover, the viscosity of the coating must be suitable for applying to the panel and if the coating is being applied in a pattern, the viscosity of the coating during application must be such that the coating will not flow to an extent that the pattern is destroyed or that the pattern loses a sharp outline. The actual treatment of the panel e.g. the heating and pressure conditions used in the bonding step, will also be important.

Examples of the coatings that may be used as the second coating are homogeneous admixtures of benzyl alcohol, phenol and polyamide and homogeneous admixtures of catechol, benzyl alcohol and methanol, as disclosed in the copending application of A.J. Cesaroni filed concurrently herewith. Other bonding agents are referred to in that application. Alternatively, it is known to bond polyamides to polyamides, if the polymer is a polyamide, using aqueous solutions of phenol e.g. phenol containing 10–15% by weight of water, resorcinol-/ethanol solutions e.g. solutions containing equal parts of resorcinol and ethanol, and polyamide-bodied calcium chloride/ethanol solutions e.g. a solution of 10% by weight of polyhexamethylene adipamide, 22.5% by weight of calcium chloride and 67.5% by weight of ethanol. Other adhesive combinations are known for use with other polymers. As will be appreciated by those skilled in the art, the bond strength that must be formed between the two panels of the heat exchanger will depend at least in part on the intended end use for the heat exchanger. Thus, it is important that the selected coating composition to be applied as second coating be carefully checked for suitability for the end use. For instance, it is known that some of the aforementioned coatings for polyamides, especially the benzyl alcohol/phenol/ polyamide or catechol/benzyl alcohol/methanol systems will usually provide superior bond strengths than others of the aforementioned coatings.

The coating applied to the first panel is a resist coating. As used herein, resist coating is a coating that does not bond significantly to the second coating under the heating and pressure conditions used in the fabrication of the heat exchanger. Examples of resist coatings include graphite and titanium dioxide. A preferred resist coating for use with polyamides is polyvinyl alcohol, and compositions thereof.

The polymer composition used for forming the heat exchanger will usually be of relatively high thermal resistance, but at the thicknesses used according to the present invention, thermal conductivity or thermal resistance tends to be a minor or even insignificant factor in the performance of the resultant heat exchanger. The polymer must, however, be selected so that at the thickness used in the fabrication of the heat exchanger, the resultant heat exchanger has sufficient tensile strength at the maximum working temperature of the heat exchanger to withstand the maximum working pressure of the fluid within the panel without rupture or short or long term distoration. Furthermore, it must withstand prolonged contact with the working fluids of the heat exchanger without degradation, as well as being resistant to contaminants which may occur in the working environment. It should also be fatigue resistant, have a low creep modulus, provide a sufficiently rigid panel structure, and preferably be impact resistant. Thus, the actual choice of polymer composition will depend to a large extent upon the working environment and the fabrication process utilized.

A wide variety of polymers are potentially useful in the fabrication of the panel heat exchangers of the present invention. The selection of such polymers will depend on a number of factors, as discussed above, in order to obtain a heat exchanger with the properties required for operation under a particular set of operating conditions. Examples of polymers include polyethylene, polypropylene, polyamides, polyesters, polycarbonates, polyphenylene oxide, polyphenylene sulphide, polyetherimide, polyetheretherketone, polyether ketone, polyimides, polyarylates and high performance engineering plastics. Such polymers may contain stabilizers, pigments, fillers and other additives known for use in polymer compositions. The nature of the polymer composition used may affect the efficiency of the heat exchanger, as it is believed that heat is capable of being dissipated from the heat exchanger by at least both convection and radiation.

In a particularly preferred embodiment of the present invention, the polymer is a polyamide, examples of which are the polyamides formed by the condensation polymerization of an aliphatic or aromatic dicarboxylic acid having 6–12 carbon atoms with an aliphatic primary diamine having 6–12 carbon atoms. Alternatively, the polyamide may be formed by condensation polymerization of an aliphatic lactam or alpha, omega aminocarboxylic acid having 6–12 carbon atoms. In addition, the polyamide may be formed by copolymerization of mixtures of such dicarboxylic acids, diamines, lactams and aminocarboxylic acids. Examples of dicarboxylic acids are 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,12-dodecanedioic acid and terephthalic acid. Examples of diamines are 1,6-hexamethylene diamine, 1,8-octamethylene diamine, 1,10-decamethylene diamine and 1,12-dodecamethylene diamine. An example of a lactam is caprolactam. Examples of alpha,omega aminocarboxylic acids are amino octanoic acid, amino decanoic acid and amino dodecanoic acid. Preferred examples of the polyamides are polyhexamethylene adipamide and polycaprolactam, which are also known as nylon 66 and nylon 6, respectively.

The polymer may be a filled and/or toughened polymer, especially where the polymer is a polyamide. In embodiments, the filler is glass fibre and/or the polymer has been toughened with elastomeric or rubbery materials, especially where the elastomeric or rubbery materials are well dispersed within the polymer matrix but tend to remain in the form of a second phase. Alloys and/or blends of polymers, especially alloys and/or blends of polyamides may also be used.

In an embodiment of the present invention, the polyamide may be a so-called amorphous polyamide. The amorphous polyamide may be used as the sole polyamide, or admixed with another polymer e.g. a polyamide of the type disclosed above.

As will be appreciated by those skilled in the art, the polyamides described above exhibit a wide variety of properties. For instance, melting points of polymers of dicarboxylic acid/diamine polymers will differ significantly from polymers of lactams or alpha,omega aminocarboxylic acids and from copolymers thereof. Similarly, other properties e.g. permeability to fluids, gases and other materials will also vary. Thus, even if the polymer selected is polyamide, a particular polyamide may have to be selected for a particular end use.

In an embodiment of the present invention, the polyamide may be a so-called amorphous polyamide. The amorphous polyamide may be used as the sole polyamide, or admixed with a polyamide of the type disclosed above. If the panels are formed from amorphous polyamide, it is believed to be possible to operate the process of the invention without coating the second panel with the second coating composition.

Laminated or coated materials may often be utilized with advantage. Such materials could comprise a layer providing the necessary physical resistance and inner and/or outer layers to provide resistance to the working fluids or contaminants. An inner layer may be selected to provide, as well as chemical resistance, improved bonding properties with the opposite layer bonded thereto. The laminate may include a fabric layer, woven for example from monofilament nylon, bonded to an inner layer providing impermeability to fluids and a bonding medium. The weave pattern of such a fabric outer layer may be utilized to assist in providing advantageous surface microturbulence, on the inner and/or outer surface of the panel. Such a fabric reinforcing layer need not necessarily be fabricated from synthetic plastic; a metal foil or fabric layer could be utilized and would provide an extended heat transfer surface having good heat conductivity. Techniques for the manufacture of multi-layered structures are known to those skilled in the art, including lamination, coating and calendering.

The use of laminates or other multi-layered structures may be limited by other steps in the method of fabrication of the heat exchangers e.g. the need to expand the labyrinth of passages in order to permit flow of fluid through the heat exchanger.

In preferred embodiments, the panel heat exchangers of the present invention have wall thicknesses, at least in those portions where transfer of heat will occur, of less than 0.7 mm, and especially in the range of 0.12–0.5 mm, particularly 0.15–0.4 mm. At such wall thicknesses, the transmission of heat through the wall tends to become substantially independent of wall thickness, and thus wall thickness may become a minor or insignificant factor in the operating effctiveness of the heat exchanger. It is to be understood, however, that the polymer composition and the wall thickness must be selected so that the resultant heat exchanger will have the necessary physical properties to be acceptable for the intended end use, as discussed above.

In embodiments in which the polymer is polyamide and the second coating is the aforementioned benzyl alcohol/phenol/polyamide composition, then it may be advantageous to insert a film of a polyamide between the first and second panels. Such a film tends to become bonded to the second coating and lose its integrity but it has been observed that the use of such a film results in the production of a panel heat exchanger of more uniform properties.

In embodiments of the process, steps are taken to assist in the provision of a uniform coating of the resist composition on the polymer. For example, it may be advantageous to treat the surface of the polymer to promote wetting of the polymer with the composition e.g. by treating the surface with corona discharge. Antifoam and/or surfactants may be added to the composition to reduce or prevent the formation of bubbles in the coating and to reduce or prevent beading of the composition on the surface of the polymer.

The process of the present invention provides a versatile and relatively simple method of fabricating heat exchangers that does not require the fabrication of moulds, although use of a mould having grooves or recesses may be advantageous, and obviates potential process problems associated with the melting characteristics of polyamides.

The panel heat exchangers of the present invention may potentially be used in a wide variety of end uses. For example, the heat exchangers may be used in vehicles, as discussed above. However, the exchangers may find use in refrigerators and other heating or cooling systems. The polymer may be selected so as to be relatively transparent to transmission of radiation over all or part of the electromagnetic spectrum e.g. the ultra violet, visible, infra red and longer wavelengths.

The present invention is further illustrated by the following examples.

EXAMPLE I 2 g of benzyl alcohol were admixed with 10 g of phenol and heated to 100° C. A polyamide (polyhexamethylene adipamide), 2 g, in flake form was then added to the admixture and stirred until the polyamide had dissolved. The resultant homogeneous admixture was then cooled to ambient temperature; the admixture obtained appeared to be homogeneous and had a viscosity similar to liquid honey.

The admixture was coated onto a polyamide (polyhexamethylene adipamide) in the form of film. The coated film was contacted with a similar polyamide film that had been coated with the pattern of a labyrinth of the type shown in FIG. 1. The resist coating applied as the pattern was polyvinyl alcohol. The resultant film combination was placed in a platen press at a temperature that varied between 120° and 190° C.

The laminate obtained was cooled and then tested. It was found that a strong bond had been formed between the films at the locations where the polyvinyl alcohol had not been coated onto the film.

EXAMPLE II

The procedure of Example I was repeated using panels formed from polycarbonate, instead of polyamide. One polycarbonate film was coated with polyvinyl alcohol in the pattern of the labryinth, while the other polycarbonate film was uncoated i.e. a coating of benzyl alcohol/phenol/polymer was not applied to the film. The resultant film combination was placed in the platen press.

It was found that a strong bond was formed between the films in the locations where polyvinyl alcohol had not been coated on the film.

EXAMPLE III

The procedure of Example II was repeated using colloidal graphite as a resist coating i.e. the polycarbonate was coated with graphite in the pattern of the labyrinth.

After pressing in a heated platen press, it was found that a strong bond was formed between the films in the locations where the graphite had not been coated on the film.

We claim:

1. A process for the manufacture of a heat exchanger from a thermoplastic polymer, said thermoplastic polymer being a polyamide, said heat exchanger comprising a first panel and a second panel, each of said panels having a thickness in the range of 0.12 to 0.7 mm, being generally planar and formed from said polymer, said panels being bonded together to define a labyrinth of fluid-flow passages extending between inlet and outlet header means, said labyrinth occupying a substantial proportion of the area of the panels, said process comprising the steps of:
(a) coating the first panel with a first coating composition, said first coating composition comprising polyvinyl alcohol, in a pattern corresponding to the fluid passages of the labyrinth;
(b) coating the second panel with a second coating composition in at least those areas corresponding to the areas of the first and second panel that will be bonded together;
(c) contacting said first and second panels and applying heat and pressure thereto to effect bonding between said panels; and
(d) expanding the fluid passages to facilitate the flow of liquid therethrough;
(e) said second coating composition being such that the composition adheres to the polymer of the first panel but not to the first coating composition under the influence of the heat and pressure applied in step (c).

2. The process of claim 1 in which the coating on the second panel is a complementary image of the coating applied to the first panel.

3. The process of claim 1 in which the coating applied to the second panel covers essentially all of the second panel.

4. The process of claim 1 in which the second panel is coated to an extent that is greater than the complementary image on the first panel but less than a complete coating of the second panel.

* * * * *